D. G. ADELSBERGER.
Horse Rake.
No. 52,122.
Patented Jan'y 23, 1866.
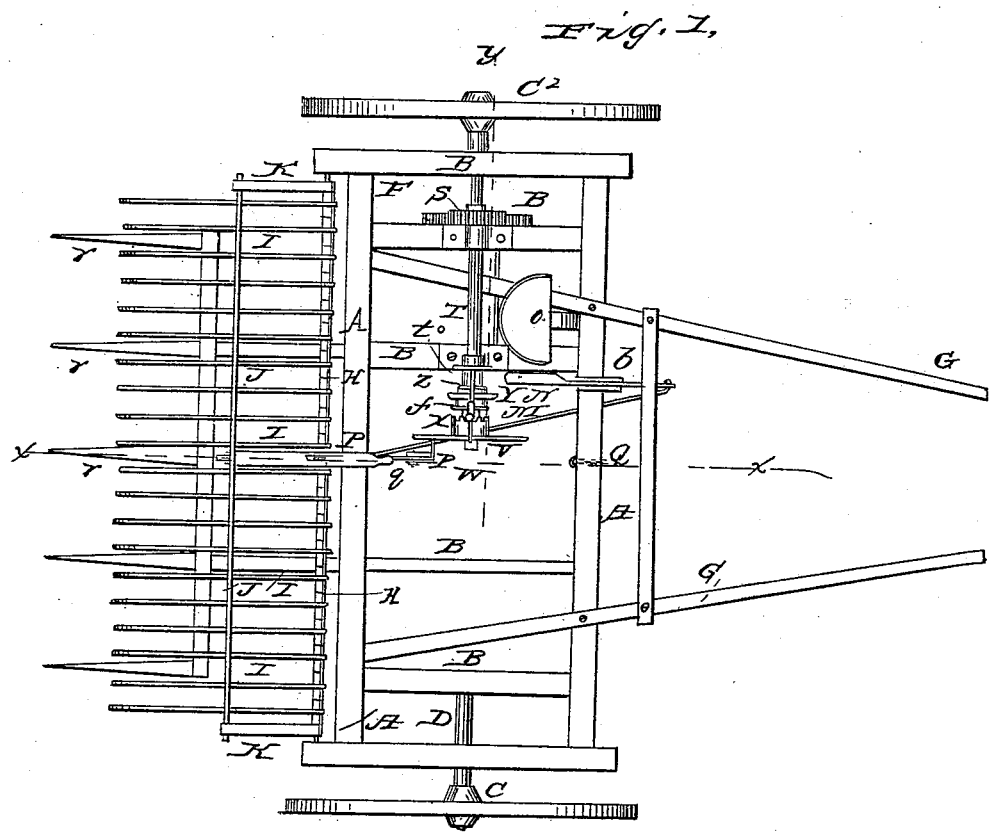
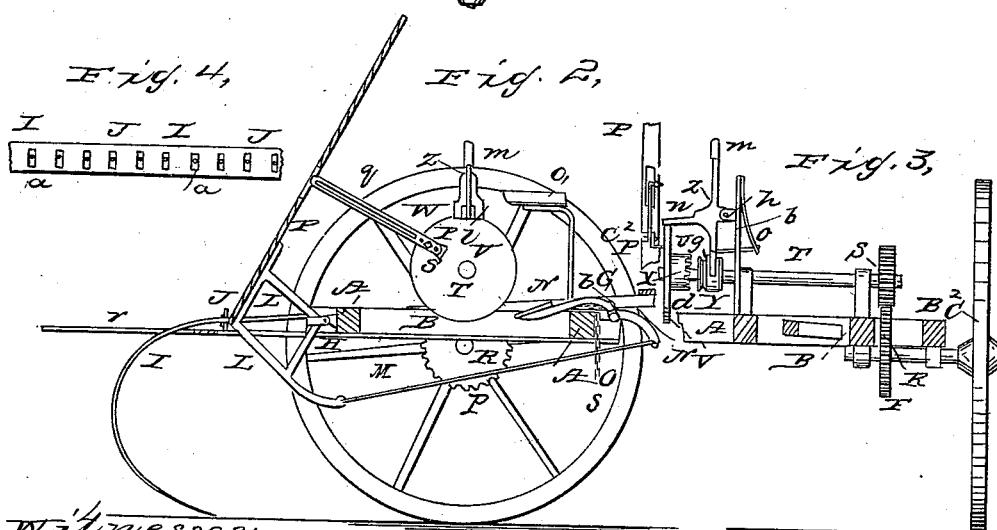

UNITED STATES PATENT OFFICE.

DANIEL G. ADELSBERGER, OF EMMITTSBURG, MARYLAND.

IMPROVEMENT IN HORSE-RAKES.

Specification forming part of Letters Patent No. 52,122, dated January 23, 1866.

*To all whom it may concern:*

Be it known that I, DANIEL G. ADELSBERGER, of Emmittsburg, in the county of Frederick and State of Maryland, have invented new and useful Improvements in Horse Raking-Machines; and I do hereby declare that the following is a full, clear, and exact description thereof, which will enable others skilled in the art to make and use the same, reference being had to the accompanying drawings, forming part of this specification.

The present invention principally consists in connecting the rake-teeth, all of which are hung in or to a common frame, in such a manner with the main or wheel axle of the machine that, when so desired, as the machine is moving along and over the ground the teeth can be raised or lifted therefrom, so as to discharge the hay from them, and lowered again by the forward movement of the machine itself, the arrangement of the said parts being also of such a nature that they can be adjusted so as to raise and lower the rake-teeth as the machine passes over a lesser or greater length of ground.

In accompanying plate of drawings my improvements are illustrated, Figure 1 being a plan or top view of my improved horse raking-machine; Fig. 2, a vertical section of the machine, taken in the plane of the line $x\,x$, Fig. 1; Fig. 3, a similar section to Fig. 2, but taken in the plane of the line $y\,y$, Fig. 1; Fig. 4, a detail view to be hereinafter referred to.

A A in the drawings represent the frame of the machine, strengthened by cross-ties or braces B; C C$^2$, the drive-wheels, one upon each end of the frame, the one, C, turning upon a short fixed axle-bar, D, of the frame, and the other, C$^2$, by its axle-shaft F, in bearings of the cross-bars at such end of the frame, both axles, however, being in the same plane with regard to each other and their intermediate frame A; G, a pair of shafts secured to the front side of the frame A, in which a horse is harnessed in the usual manner.

Parallel to the back side of the frame A, and for the whole width of the machine, extends a shaft or rod, H, turning in bearings at each end and the center of the frame, to which shaft is secured a series of spring rake-teeth, I I, placed side by side and at short distances apart for the whole length, or nearly so, of the shaft, these teeth being bent into the form shown in the drawings, or of any other of the ordinary forms of rake-teeth now in use which would be applicable.

Across the entire series of teeth I extends a cross-plate, J, through a series of apertures, $a\,a$, of which the teeth pass, the plate being secured at each end, by connecting-pieces K K, with the common shaft H of the rake-teeth.

At the center of the cross-plate J, and extending above and below it, is fixed at one of its angles, in a vertical plane, an angular-shaped frame or plate, L, the opposite side of said plate being hung and turning upon the shaft H.

To the lower end of the frame L is hung a rod, M, passing under the main frame of the machine to the front side thereof, where it is hung to a pedal-lever, N, turning upon a fulcrum, b, of the frame A, so that by pressing down upon the pedal end of such lever with the foot, the driver of the machine being seated upon the spring-seat attached to the frame A at a convenient point therefor, the rake-teeth will be brought to bear upon the ground, either with a greater or lesser degree of pressure, according as may be desired or requisite, as is evident without further explanation.

Upon the upper side of the angular frame L is secured a handle, P, made of such a shape as to be readily reached by the driver when in his seat, so that by pulling said handle toward him the rake-teeth will be entirely raised from the ground, where they are held by means of a properly-arranged chain, Q, therefor, having a hook at its end, the teeth falling by their own weight when the chain is disengaged from the handle.

Fixed on the turning axle F, inside of the frame, is a gear-wheel, R, interlocking with which, and above it, is another gear-wheel, S, fixed on a horizontal shaft, T, turning in bearings upon the upper side of the frame A.

On the inner end of shaft, and about halfway across the machine, is a loose wheel or disk, V, having a notch, W, cut in it at one point of the same. This wheel is secured to a collar or sleeve, X, surrounding the shaft, and having its edge toothed or serrated. Y is a sliding sleeve-clutch placed upon the shaft T, and so connected with it as to revolve with it, but yet free to be moved back and forth on the shaft, which clutch, upon its edge toward the toothed collar X of the wheel V, has prongs $d\ d$.

$f$ is a groove around the clutch, with which engages the forked end $g$ of a vertical lever, Z, turning upon a fulcrum, $h$, of the standard $l$ of the frame A, the upper end of which lever has a handle, $m$, for operating the same. $n$ is a projecting arm of the lever Z, engaging at its outer end with the wheel-notch W, before referred to, a spring, $o$, connected with the lever holding the same therein.

$p$ is a crank-arm on one face of the wheel V, connected by a slotted rod, $q$, with the lever-arm P of the rake-teeth, hereinbefore referred to.

When desired, as the machine is moving over the ground and raking hay to discharge it from its teeth, pull the handle of the lever Z in the proper direction to interlock the prongs of the clutch connected with it with the teeth of the wheel-collar X, which movement at the same time disengages the lever-arm $n$ from the notch of the wheel, when the wheel consequently revolves in unison with the shaft T, connected with the axle F, as described, and acting through the connecting-rod $q$, thereby raising and lowering the rake-teeth from and to the ground, the hay being thrown off of the rake-teeth as they are lifted by the series of interlocking fixed prongs or teeth $r\ r$ of the frame A. During this movement of the wheel V the arm $n$ of the lever rests upon its edge, thus holding the clutch engaged with it until the arm falls into its notch W, when the clutch is thrown back from the wheel, disengaging from its collar, the wheel then remaining stationary, but susceptible of the same movement, when so desired, by simply throwing the clutch into connection with it, as before explained.

By shortening or lengthening the connecting-rod $q$ for the rake-teeth a quicker or slower movement will be imparted thereto as the wheel V rotates, and for this purpose a series of apertures, S S, are made in the rod at one end, so that its hinging-point to the wheel-crank can be changed at pleasure.

I claim as new and desire to secure by Letters Patent—

Connecting the rake-teeth of the machine with the main or revolving axle-shaft F through a connecting-rod, $q$, wheel V, vertical lever Z, and sliding clutch Y of the shaft T, geared or otherwise properly connected with the said axle-shaft, all arranged and operating together substantially in the manner described, and for the purpose specified.

DANIEL G. ADELSBERGER.

Witnesses:
ISAAC HYDER,
GEORGE LAWRENCE.